(12) United States Patent
Bass et al.

(10) Patent No.: US 7,537,027 B2
(45) Date of Patent: May 26, 2009

(54) VALVE WITH DUEL OUTLET PORTS

(75) Inventors: Gary S. Bass, Independence, KY (US); Ronald J. Mulford, Aurora, IN (US)

(73) Assignee: Campbell Hausfeld/Scott Fetzer Company, Harrison, OH (US)

( * ) Notice: Subject to any disclaimer, the term of this patent is extended or adjusted under 35 U.S.C. 154(b) by 631 days.

(21) Appl. No.: 10/985,247

(22) Filed: Nov. 10, 2004

(65) Prior Publication Data

US 2005/0109407 A1 May 26, 2005

Related U.S. Application Data

(60) Provisional application No. 60/524,672, filed on Nov. 24, 2003.

(51) Int. Cl.
*F16K 11/044* (2006.01)
(52) U.S. Cl. ............................. 137/625.5; 137/625.27
(58) Field of Classification Search ............. 137/625.5, 137/625.27, 625.48, 625.49
See application file for complete search history.

(56) References Cited

U.S. PATENT DOCUMENTS

| | | |
|---|---|---|
| 574,003 A | 12/1896 | Rinsche |
| 635,422 A | 10/1899 | Burns |
| 724,811 A | 4/1903 | Clement |
| 745,900 A | 12/1903 | Payton |
| 776,671 A | 12/1904 | Maximilian |
| 810,603 A | 1/1906 | Badger |
| 839,031 A | 12/1906 | Prindle |
| 855,975 A | 6/1907 | Prindle |
| 909,740 A | 1/1909 | Beckfield |
| 910,224 A | 1/1909 | Norling |
| 946,368 A | 1/1910 | Jones |
| 974,375 A | 11/1910 | Gilman |
| 1,089,243 A | 3/1914 | Maximilian |
| 1,238,255 A | 8/1917 | Burkel |
| 1,297,679 A | 3/1919 | Haeseler |
| 1,590,269 A | 6/1926 | Wade |
| 1,594,964 A | 8/1926 | Jimerson |
| 1,669,233 A | 5/1928 | Duchesne |

(Continued)

OTHER PUBLICATIONS

Printout from Cooper Tools web site at www.coopertools.com, one page entitled "Impact Wrenches", showing Master Power model MP2270 impact wrench, copyright 2003.

(Continued)

*Primary Examiner*—Kevin L Lee
(74) *Attorney, Agent, or Firm*—Jones Day

(57) ABSTRACT

An apparatus includes a valve body defining a chamber located on an axis. The chamber has axially upper and lower ends. The chamber further has upper and lower orifices located at the upper and lower ends through which air can exit the chamber. An upper plug is configured, in a closed position, to close the upper orifice. A lower plug is configured, in a closed position, to close the lower orifice. A spring is compressed between the plugs so as to elastically urge the plugs axially apart and into their respective closed positions. A plug displacement device is configured to displace the upper plug from its closed position against bias of the spring into an open position, and to displace the lower plug from its closed position against the bias of the spring into an open position.

9 Claims, 8 Drawing Sheets

U.S. PATENT DOCUMENTS

| | | | | |
|---|---|---|---|---|
| 1,674,579 | A | 6/1928 | vanHamersveld | |
| 1,704,399 | A | 3/1929 | Meunier | |
| 1,713,310 | A | 5/1929 | vanHamersveld | |
| 1,757,731 | A | 5/1930 | Norling | |
| 1,771,238 | A | 7/1930 | Walsh | |
| 1,781,130 | A | 11/1930 | Shaff | |
| 1,860,736 | A | 5/1932 | Gartin | |
| 1,921,753 | A | 8/1933 | Hoffman | |
| 1,978,118 | A | 10/1934 | Stevens | |
| 1,999,369 | A | 4/1935 | Norling | |
| 2,104,468 | A | 1/1938 | Osborn | |
| 2,177,158 | A | 10/1939 | Smith, Jr. | |
| 2,197,626 | A | 4/1940 | Scheven | |
| 2,221,100 | A | 11/1940 | Lear | |
| 2,233,163 | A | 2/1941 | Fosnot | |
| 2,374,019 | A | 4/1945 | Kahler | |
| 2,413,542 | A | 12/1946 | Butts | |
| 2,476,632 | A | 7/1949 | Shaff | |
| 2,493,957 | A | 1/1950 | Fitch | |
| 2,542,038 | A | 2/1951 | Lewis | |
| 2,566,183 | A | 8/1951 | Forss | |
| 2,585,975 | A | 2/1952 | Terry | |
| 2,607,559 | A | 8/1952 | Forss | |
| 2,655,901 | A | 10/1953 | Brown | |
| 2,703,557 | A | 3/1955 | Polki | |
| 2,751,922 | A | 6/1956 | Miller | |
| 2,784,818 | A | 3/1957 | Maurer | |
| 3,093,360 | A | 6/1963 | Krouse | |
| 3,326,240 | A | 6/1967 | McConnaughay | |
| 3,352,368 | A | 11/1967 | Maffey | |
| 3,398,802 | A | 8/1968 | Clark | |
| 3,402,778 | A | 9/1968 | Carter | |
| 3,477,523 | A | 11/1969 | Lewis | |
| 3,620,311 | A | 11/1971 | Brown | |
| 3,635,605 | A | 1/1972 | Hall | |
| 3,718,313 | A | 2/1973 | Miller | |
| 3,724,563 | A | 4/1973 | Wickham | |
| 3,833,068 | A | 9/1974 | Hall | |
| 3,924,961 | A | 12/1975 | Hess | |
| 3,974,861 | A * | 8/1976 | Goto et al. | 137/627.5 |
| 3,989,113 | A | 11/1976 | Spring | |
| 4,016,940 | A | 4/1977 | Spring | |
| 4,236,589 | A | 12/1980 | Griffith | |
| 4,265,322 | A | 5/1981 | Emonet | |
| 4,319,607 | A * | 3/1982 | Fields | 137/625.5 |
| 4,398,560 | A | 8/1983 | Black | |
| 4,708,210 | A | 11/1987 | Rahm | |
| 4,844,177 | A | 7/1989 | Robinson | |
| 4,924,911 | A * | 5/1990 | Schmalenbach et al. | 137/625.5 |
| 5,092,410 | A | 3/1992 | Wallace | |
| 5,152,320 | A * | 10/1992 | Zimmerly | 137/625.5 |
| 5,303,781 | A | 4/1994 | Lin | |
| 5,377,769 | A | 1/1995 | Hasuo | |
| 5,417,294 | A | 5/1995 | Suher | |
| 5,609,300 | A | 3/1997 | Conatser | |
| 5,626,198 | A | 5/1997 | Peterson | |
| 5,639,219 | A | 6/1997 | Conatser | |
| 5,797,462 | A | 8/1998 | Rahm | |
| 5,913,370 | A | 6/1999 | Chapelle | |
| 5,918,686 | A | 7/1999 | Izumisawa | |
| 5,992,539 | A | 11/1999 | Lin | |
| 6,047,780 | A | 4/2000 | Lin | |
| 6,062,323 | A | 5/2000 | Pusateri | |
| 6,158,528 | A | 12/2000 | Izumisawa | |
| 6,234,256 | B1 | 5/2001 | Kettner | |
| 6,250,399 | B1 | 6/2001 | Giardino | |
| 6,443,239 | B1 | 9/2002 | Izumisawa | |
| 6,527,060 | B1 | 3/2003 | Schoeps | |
| 6,561,284 | B2 | 5/2003 | Taga | |
| 6,578,645 | B2 | 6/2003 | Fahr | |
| 6,585,060 | B1 | 7/2003 | Iritani | |
| 6,634,438 | B1 | 10/2003 | Pusateri | |
| 6,695,072 | B2 * | 2/2004 | Izumisawa | 173/168 |
| 6,708,779 | B2 | 3/2004 | Taga | |
| 2002/0112867 | A1 | 8/2002 | Tseng | |
| 2003/0010513 | A1 | 1/2003 | Taga | |
| 2003/0037939 | A1 | 2/2003 | Taga | |
| 2003/0121680 | A1 | 7/2003 | Izumisawa | |
| 2003/0226674 | A1 | 12/2003 | Putney | |
| 2004/0060718 | A1 | 4/2004 | Izumisawa | |

OTHER PUBLICATIONS

Printout from Campbell Hausfeld web site at www.chpower.com, one page entitled "Campbell Hausfeld—Built to Last—Catalog" and subtitled "Swivel Connecter Model: MP103800AV"; undated.

Printout from Campbell Hausfeld web site at www.chpower.com, one page entitled "Campbell Hausfeld—Built to Last—Catalog" and subtitled "⅜" Butterfly Impact Wrench Model: MP101700AV; undated.

Printout from Jack-X-Change web page at http://www.jackxchange.com/products/IR216.cfm, showing Ingersoll Rand Model IR216 impact wrench; copyright 2004.

* cited by examiner

VALVE WITH DUEL OUTLET PORTS

CROSS-REFERENCE TO RELATED APPLICATION

This application claims the benefit of U.S. Provisional Application No. 60/524,672, filed Nov. 24, 2003.

TECHNICAL FIELD

This technology relates to fluid control valves.

BACKGROUND

A pneumatic hand tool includes a tool housing. A rotatable shaft projects from the housing. The shaft is driven by a bi-directional air motor within the housing. Operation of the motor is manually controlled by a lever pivotably attached to the housing.

SUMMARY

An apparatus includes a valve body defining a chamber located on an axis. The chamber has axially upper and lower ends. The chamber further has upper and lower orifices located at the upper and lower ends through which air can exit the chamber. An upper plug is configured, in a closed position, to close the upper orifice. A lower plug is configured, in a closed position, to close the lower orifice. A spring is compressed between the plugs so as to elastically urge the plugs axially apart and into their respective closed positions. A plug displacement device is configured to displace the upper plug from its closed position against bias of the spring into an open position, and to displace the lower plug from its closed position against the bias of the spring into an open position.

A second apparatus includes a valve body located on an axis. The body defines an axially extending channel. The channel includes an axially upper chamber, an axially lower chamber and a central chamber located between the upper and lower chambers. The body further defines an upper outlet port open to the upper chamber, a lower outlet port open to the lower chamber, and an inlet port open to the central chamber. A valve stem extends axially in the channel. The stem is shiftable between a neutral position for isolating both outlet ports from the inlet port, a lower position below the neutral position for communicating the upper outlet port with the inlet port, and an upper position above the neutral position for communicating the lower outlet port with the inlet port, without blocking the inlet port in any of the three positions.

A third apparatus includes a valve body. The body has a channel extending along an axis and an inlet port communicating with the channel. A sleeve is received about the valve body, overlies the inlet port, and is rotatable about the axis relative the body. A nozzle projects radially outward from the sleeve. The nozzle is rotatable with the sleeve into a range of positions in which the nozzle communicates with the inlet port through the sleeve.

A fourth apparatus includes an elongated tool housing. The housing has a longitudinal axis, axially front and rear ends, and a surface extending circumferentially about the longitudinal axis. An output structure is exposed through the front end of the housing and is rotatable about the longitudinal axis. A bi-directional air motor has first and second inlets through which air can be directed to power the motor to drive the output structure in respectively forward and rearward directions. A valve body is supported by the housing. The body has an inlet port and first and second outlet ports respectively connected to the first and second motor inlets. A valve stem extends, within the valve body, perpendicular to the longitudinal axis of the housing. The stem is linearly shiftable between a first activating position that causes the air to be discharged from the first outlet port but not the second outlet port, a second activating position that causes the air to be discharged from the second outlet port but not the first outlet port, and a neutral position, located between the two activating positions, that does not cause the air to be discharged from either outlet port.

A fifth apparatus includes an elongated tool housing. The housing has a longitudinal axis, axially front and rear ends, a top and a bottom, and a surface extending circumferentially about the axis. An output structure is exposed through the front end of the housing and is rotatable about the longitudinal axis. An elongated axially extending activation lever is pivotably connected to the housing with a pivotal axis transverse to the housing axis. The lever has a top surface with axially front and rear ends respectively forward and rearward from the pivotal axis. The top surface is convex, highest above the pivotal axis and receding to the front and rear ends of the lever. A spring biases the lever into a neutral position. The spring enables the lever to be pivoted, against the bias, into a first pivoted position by depressing the rear end and into a second pivoted position by depressing the front end. A motor within the housing is configured to rotate the output structure in a forward direction when the lever is in the first pivoted position, in a reverse direction when the lever is in the second pivoted position, and in neither direction when the lever is in the neutral position.

DESCRIPTION

Figure 1:
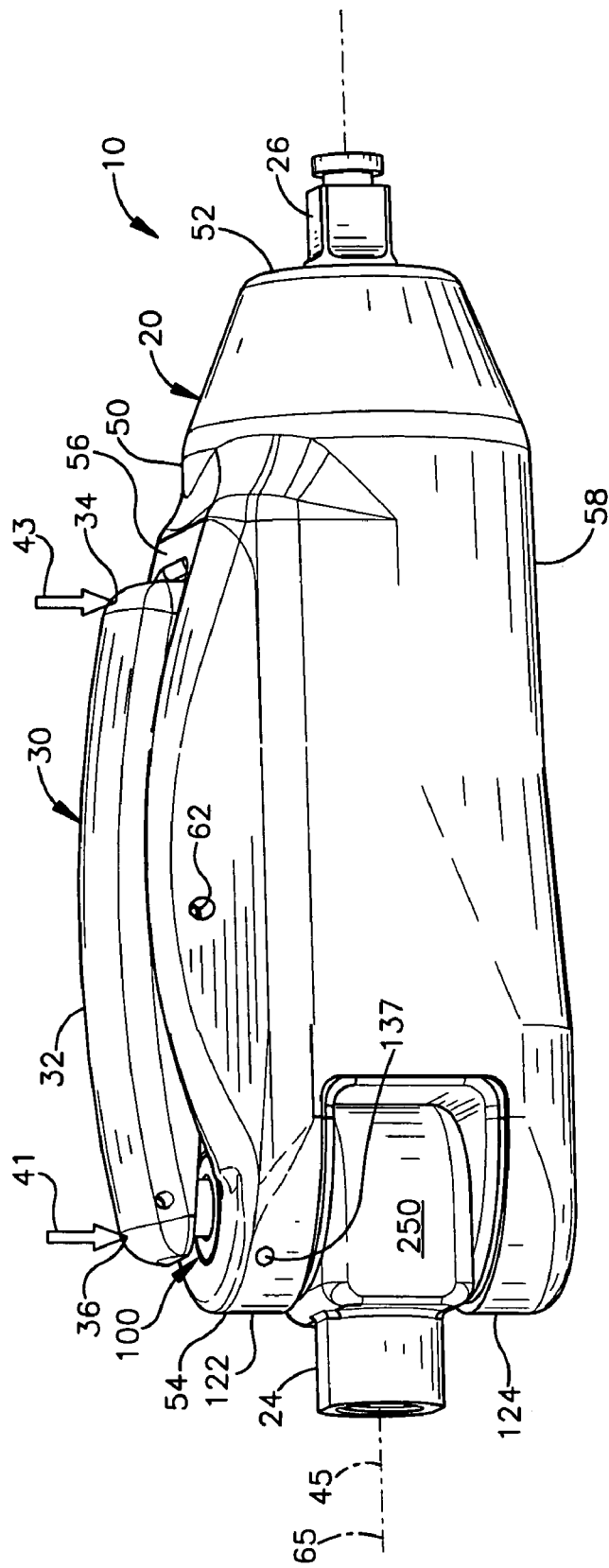
FIG. 1 is a perspective view of a pneumatic hand tool.

The apparatus 10 shown in FIG. 1 has parts that are examples of the elements recited in the claims.

The apparatus 10 is a pneumatic hand tool, in this example a handheld impact wrench. It includes a housing 20, an air inlet nozzle 24, and a rotatable output structure 26. An activation lever 30 is pivotably connected to the housing 20. The lever 30 has an elongated top surface 32 with longitudinally opposite ends 34 and 36. The lever 30 is shown in FIG. 1 in a neutral position. With the lever 30 in this position, the tool 10 is not activated to rotate the shaft. By depressing one end 36 of the lever 30, as indicated by arrow 41, the lever 30 is pivoted from the neutral position to a first pivoted position. This activates the tool 10 to rotate the output structure 26 in a forward direction. By depressing the opposite end 34 of the lever 30, as indicated by arrow 43, the lever 30 is pivoted from the neutral position to a second pivoted position. This activates the tool 10 to rotate the output structure 26 in a reverse direction.

The "forward" direction is an arbitrary rotational direction, and the "reverse" direction is a rotational direction opposite the forward direction. In this example, the output structure 26 rotates clockwise, as viewed from the rear end 54, when the front end 34 of the lever 30 is depressed, and rotates counterclockwise, as viewed from the rear end 54, when the rear end 36 of the lever 30 is depressed.

The housing 20 has a longitudinal axis 45 and a peripheral surface 50 extending circumferentially about the axis 45. The housing 20 further has axially front and rear ends 52 and 54, a top 56 and a bottom 58. The designation of "top" and "bottom" is made with respect to the orientation of the tool 10 as it is portrayed in FIG. 1. However, the tool 10 can be used in other orientations. For example, the tool 10 can be oriented with the front end 52 directed downward. Then, the "top 56" and "bottom 58" of the housing 20 would be facing sideways. Similarly, the tool 10 can be used in an orientation vertically reversed from that shown in FIG. 1. Then, the "top 56" of the housing 20 would be facing downward.

Figure 2:
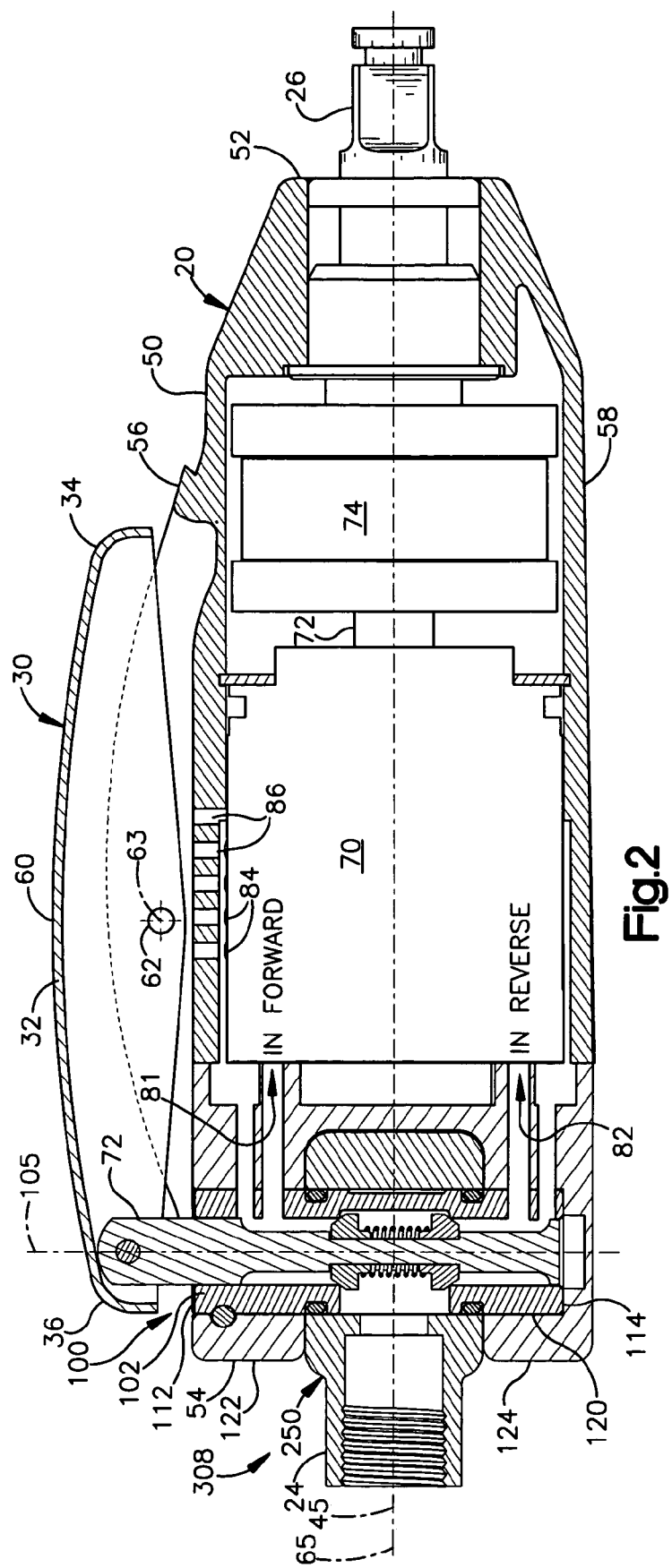
FIG. 2 is a partially schematic sectional view of the tool.

As shown in FIG. 2, the top surface 32 of the lever 30 is elongated in a direction parallel with the longitudinal axis 45 of the housing 20. The top surface 32 of the lever 30 is convex, with a highest point 60 axially centered between the front and rear ends 34 and 36. From the highest point 60, the top surface 32 recedes to the front and rear ends 34 and 36. The length of the lever 30 is more than half the length of the housing 20, defined by the distance between the front and rear ends 52 and 54 of the housing 20, and is preferably about two thirds the length of the housing 20. The lever 30 is pivotably connected to the housing 20 by a pivot pin 62. The pin 62 is centered on a pivotal axis 63 of the lever 30, located directly below the highest point 60 of the lever 30 and perpendicular to the housing axis 45.

The rotatable output structure 26 is exposed through the front end 52 of the housing 20. In this example, the output structure 26 is an anvil protruding forward through the front end 52 of the housing 20. The anvil 26 is centered on its axis of rotation 65, which coincides with the longitudinal axis 45 of the housing 20.

The anvil 26 is indirectly driven by an air motor 70 within the housing 20. This is achieved by the motor 70 rotating an output shaft 72, which drives a rotary impact hammer 74 that, in turn, rotates the anvil 26. The motor 70 has first and second inlets 81 and 82 for receiving pressurized air. Directing the pressurized air through the first and second motor inlets 81 and 82 respectively powers the motor 70 to rotate the shaft 72, and thus the anvil 26, in the forward and reverse directions. The air is exhausted from the motor 70 through motor outlets 84 and exits the housing 20 through vents 86 in the housing 20 that are under the lever 30.

The air for powering the motor 70 is received by the inlet nozzle 24. The nozzle 24 channels the pressured air to a valve 100. The valve 100 directs the air to the motor inlets 81 and 82 under control of the activation lever 30.

The valve 100 includes a valve body 102. The valve body 102 extends along a valve axis 105 that perpendicularly intersects the rotational axis 65 of the anvil 26. The body 102 has flat axially top and bottom surfaces 112 and 114. As explained above with reference to the tool 10, this designation of "top" and "bottom" is made with respect to the orientation of the valve 100 as depicted in FIG. 2. The body 102 further has a generally cylindrical side surface 120 centered on the valve axis 105.

Figure 3:
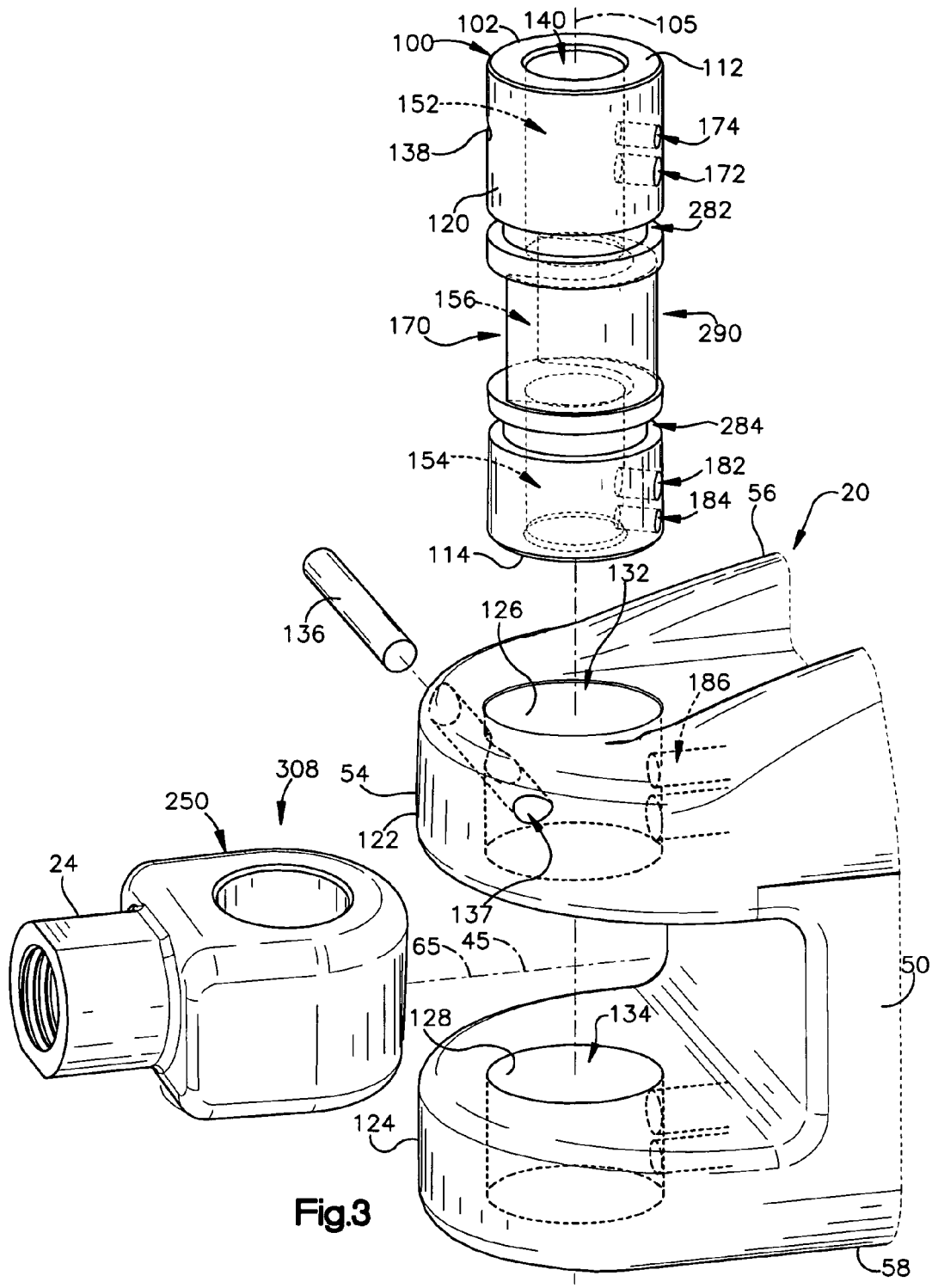
FIG. 3 is an exploded view of a rear portion of the tool.

The body 102 is supported by upper and lower valve-retaining structures 122 and 124 of the housing 20. As shown in FIG. 3, these upper and lower structures 122 and 124 have upper and lower radially-inwardly facing cylindrical surfaces 126 and 128 defining upper and lower bores 132 and 134. The valve body 102 is closely received in the bores 132 and 134, with the inwardly-facing surfaces 126 and 128 engaging the valve side surface 120 about the entire circumference of the valve side surface 120. The valve body 102 is fixed in place by a pin 136 that extends through a bore 137 in the upper valve-retaining structure 122 and engages a groove 138 in the valve side surface 120. This prevents axial and rotational movement of the body 102 relative to the housing 20.

Figure 4:
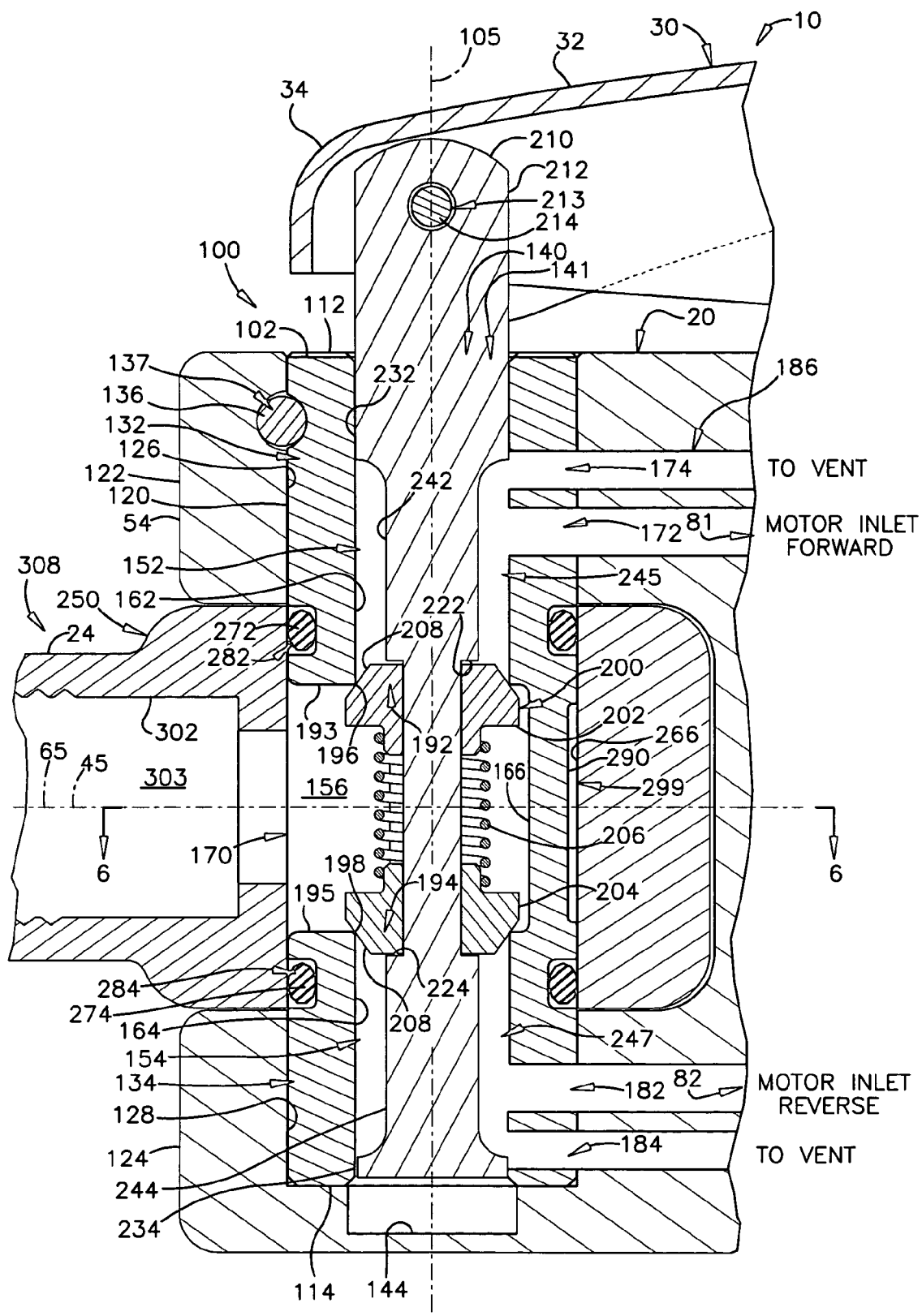
FIG. 4 is an sectional view of the rear portion of the tool, including a valve and an inlet structure.

As shown in FIG. 4, the valve body 102 has a channel 140 centered on the valve axis 105. The channel 140 extends axially downward from an opening 141 in the top surface 112 of the valve body 102 to a floor 144 within the valve body 102. The channel 140 includes upper and lower chambers 152 and 154 and a central chamber 156 located between the upper and lower chambers 152 and 154. These chambers 152, 154 and 156 are defined by respective upper, lower and central surfaces 162, 164 and 166 of the valve body 102.

An inlet port 170 is open to the central chamber 156. Proximal and distal upper outlet ports 172 and 174 are open to the upper chamber 152. Similarly, proximal and distal lower outlet ports 182 and 184 are open to the lower chamber 154. Each proximal port 172 and 182 is axially closer to the central chamber 156 than the corresponding distal port 174 and 184. The inlet port 170 is located axially between the upper and lower proximal outlet ports 172 and 182. Although the outlet ports 172, 174, 182 and 184 are portrayed in this example as being circumferentially aligned with each other, they can alternatively be circumferentially displaced from each other.

A system of air lines 186 connects the upper and lower proximal ports 172 and 182 respectively to the first and second motor inlets 81 and 82 (FIG. 2), and connects both distal ports 174 and 184 to the housing vents 86.

An upper orifice 192 is located at an upper end 193 of the central cavity 156. It enables fluid flow from the central chamber 156 into the upper chamber 152. Similarly, a lower orifice 194, located at a lower end 195 of the central cavity 156, enables fluid flow from the central chamber 156 into the lower chamber 154. Each orifice 192 and 194 is surrounded by a valve seat 196 and 198, comprising an annular edge of the body 102, centered on the valve axis 105.

A closure assembly 200 is located in the central chamber 156. The closure assembly 200 includes an upper plug 202, a lower plug 204 and a spring 206 extending axially from the upper plug 202 to the lower plug 204. In FIG. 4, the upper plug 202 is shown in a closed position. In the closed position, the upper plug 202 closes the upper orifice 192, thereby blocking fluid flow from the central chamber 156 to the upper chamber 152. Similarly, the lower plug 204 is shown in a closed position in which it closes the lower orifice 194. In this example, each plug 202 and 204 is a rubber plug with a frusto-conical surface 208 configured to sealingly mate with the respective valve seat 196 and 198.

The spring 206 is axially compressed between the plugs 202 and 204. It elastically urges the plugs 202 and 204 axially apart and into their respective closed positions. With both plugs 202 and 204 in their closed positions, as shown in FIG. 4, the valve 100 is in a neutral condition. In this example, the spring 206 is a coil spring. In an alternative example, the plugs 202 and 204 and the spring 206 can be molded as a one-piece structure having a uniform elastomeric composition. The plugs 202 and 204 are urged into their closed positions also by pressurized air entering the central chamber 156 from the inlet port 170.

A plug displacement device 210 is configured to displace the upper plug 202 from its closed position, against bias of the spring 206, into an open position. The device 210 is further configured to displace the lower plug 204 from its closed position, against the spring bias, into an open position. In this example, the plug displacement device 210 is a valve stem extending in the channel 140. The stem 210 is centered on and extends along the valve axis 105. The stem 210 has a projecting section 212 that projects upward from the valve body 102 toward and into connection with the lever 30. A bore 213 in the projecting section 212 receives a pin 214 secured to the lever 30. The bore 213 is located rearward of the pivotal axis 63 (FIG. 2). It is diametrically larger than the pin 214 to provide sufficient play to accommodate the difference in motion between the arcuate pivotal motion of the lever 30 and linear motion of the stem 210.

The stem 210 is closely received by the plugs 202 and 204 so as to keep the plugs 202 and 204 aligned with their respective orifices 192 and 194 as the plugs 202 and 204 slide along the stem 210 between their open and closed positions. The stem 210 is also received by the spring 206 to limit lateral movement of the spring 206.

The stem 210 has upper and lower abutment surfaces 222 and 224 axially facing each other. The upper abutment surface 222 is located above the upper plug 202 and is configured to push the upper plug 202 downward into its open position. The lower abutment surface 224 is located below the lower plug 204 and is configured to push the lower plug 204 upward into its open position. The abutment surfaces 222 and 224 are simultaneously close to their respective plugs 202 and 204 when the plugs 202 and 204 are in their closed positions. Accordingly, the spring bias of both plugs 202 and 204 into their closed positions biases the stem 210 into a neutral position shown in FIG. 4. The spring bias will always return the stem 210, from either above or below, to the neutral position upon removal of an outside force displacing the stem 210.

The stem 210 further has upper and lower lands 232 and 234 that respectively sealingly engage the upper and lower chamber surfaces 162 and 164 about the entire circumferences of the upper and lower chamber surfaces 162 and 164. The close fit of the upper and lower lands 232 and 234 within the respective chambers 152 and 154 prevents lateral movement, but not axial movement, of the stem 210. Additionally, the upper land 232 blocks air from escaping out of the upper chamber 152 through the opening 141 in the top surface 112 of the valve body 102.

The stem 210 has upper and lower narrowed sections 242 and 244. The upper narrowed section 242 extends axially from the upper land 232 to the upper abutment surface 222. Similarly, the lower narrowed section 244 extends from the lower land 234 to the lower abutment surface 224. The narrowed sections 242 and 244 are laterally spaced from the corresponding chamber surfaces 162 and 164. They thus provide upper and lower axial flow spaces 245 and 247 respectively located within the upper and lower chambers 152 and 154. The upper axial flow space 245 communicates with the central chamber 156 only when the upper plug 202 is in its open position. Similarly, the lower axial flow space 247 communicates with the central chamber 156 only when the lower plug 204 is in its open position.

Figure 5:
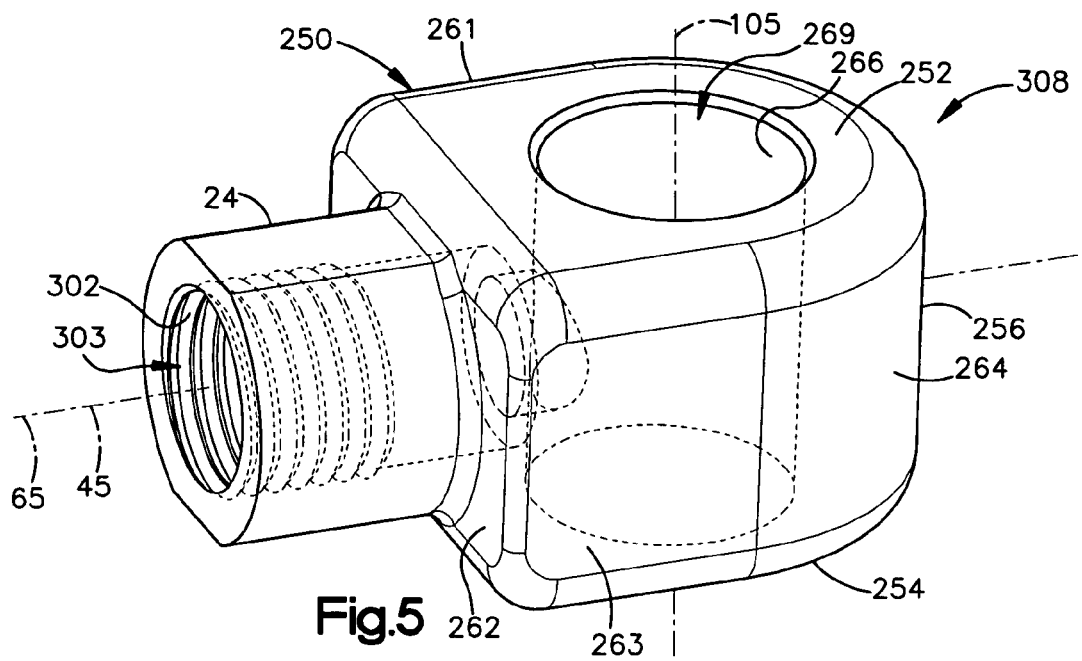
FIG. 5 is a perspective view of the inlet structure.

A sleeve 250 is received about the valve body 102. As shown in FIG. 5, the sleeve 250 has top and bottom surfaces 252 and 254 and a side surface 256. The side surface 256 includes first, second and third flat sections 261, 262 and 263, and a arcuate section 264 extending partially about the valve axis 105. A cylindrical inner surface 266 of the sleeve 250 defines a bore 269.

As shown in FIG. 4, the sleeve 250 is captured by and between the upper and lower valve-retaining structures 122 and 124 of the housing 20. This positions the sleeve 250 such that it is axially between the upper and lower proximal ports 172 and 182 and overlies the inlet port 170. Upper and lower O-rings 272 and 274 are seated in respective grooves 282 and 284 in the valve side surface 120. The O-rings 272 and 274 seal the sleeve 250 to the valve body 102 about the full circumference of valve body 102, both above and below the inlet port 170.

The side surface 120 of the valve body 102 has a circumferentially extending undercut 290, located axially between the O-ring grooves 282 and 284. This provides a circumferential flow space 299 defined by and between the inner surface 266 of the sleeve 250 and side surface 120 the valve body 102. The circumferential flow space 293 is sealed from above and below by the upper and lower O-rings 272 and 274. Despite the O-ring seal, the sleeve 250 can rotate about the valve axis 105 relative to the valve body 102.

Figure 6:
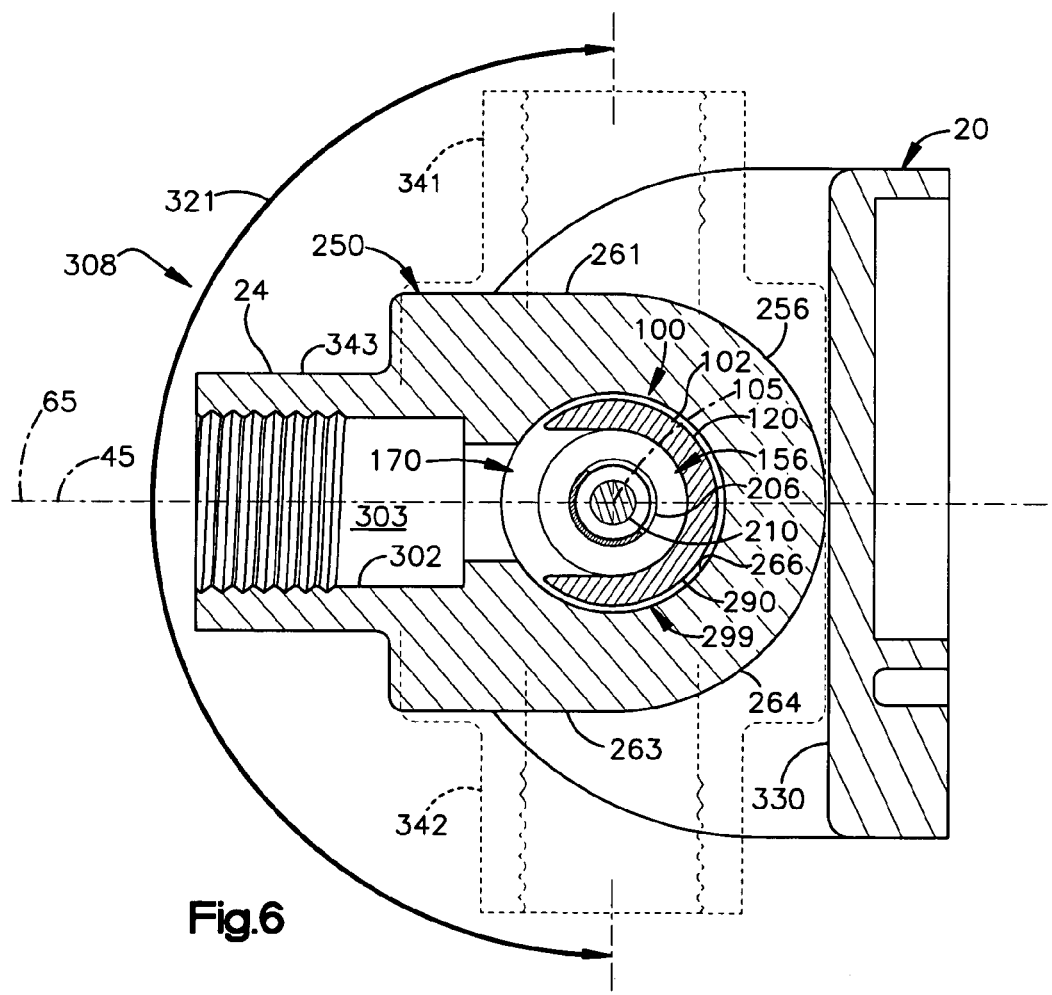
FIG. 6 is a sectional view taken at line 6-6 of FIG. 4, illustrating rotation of the inlet structure.

As shown in FIG. 6, the nozzle 24 is tubular, with an inner surface 302 defining a nozzle bore 303. The nozzle 24 projects radially outward from the sleeve 250 such that the nozzle bore 303 extends radially outward from the axially extending bore 269 of the sleeve 250. In this example, the nozzle 24 and the sleeve 250 are molded together as a one-piece inlet structure 308.

The nozzle 24 is rotatable with the sleeve 250 into a range of positions indicated by arrow 321. The range is limited by abutment of the first and third flat side surface sections 261 and 263 of the sleeve 250 with an abutment surface 330 the housing 20. The range is about 180 degrees. It extends from a first end position 341 to a second end position 342, with a center position 343 in-between. Throughout the range of positions, the nozzle 24 communicates with the inlet port 170 through the sleeve 250.

In its center position 343, the nozzle 24 extends directly rearward from the rear end 54 (FIG. 4) of the housing 20. The nozzle 24 and its bore 303 are located on and extend along the rotational axis 65 of the anvil 26 (FIG. 2). The nozzle bore 303 is aligned with the inlet port 170, so that air can flow directly through the nozzle bore 303 into the inlet port 170.

In contrast, in the two end positions 341 and 342 of the nozzle 24, the nozzle bore 303 does not overlap the inlet port 170. But the nozzle 24 still communicates with the inlet port 170 through the circumferential flow space 299 between the sleeve 250 and the valve body 102.

As shown in FIG. 4, components of the valve 100 are preferably located as follows. The valve body 102, the stem 210, the inlet port 170 and the sleeve 250 are all located on the rotational axis 65 of the anvil 26. The upper outlet ports 172 and 174 are located across the anvil axis 65 from the lower outlet ports 182 and 184. The valve stem 210 extends past the nozzle 24 in that it extends both above and below the nozzle 24. The nozzle 24 is located axially between the upper and lower proximal outlet ports 172 and 182.

Operation of the tool 10 is exemplified by the following steps. First, referring to FIG. 1, a user grasps the tool 10 by wrapping a hand circumferentially about the peripheral surface 50 (FIG. 1) of the housing 20. The user's thumb overlies the housing bottom 58. The index finger and little finger can overly the front and rear ends 34 and 36 respectively, or vice versa.

Figure 7:
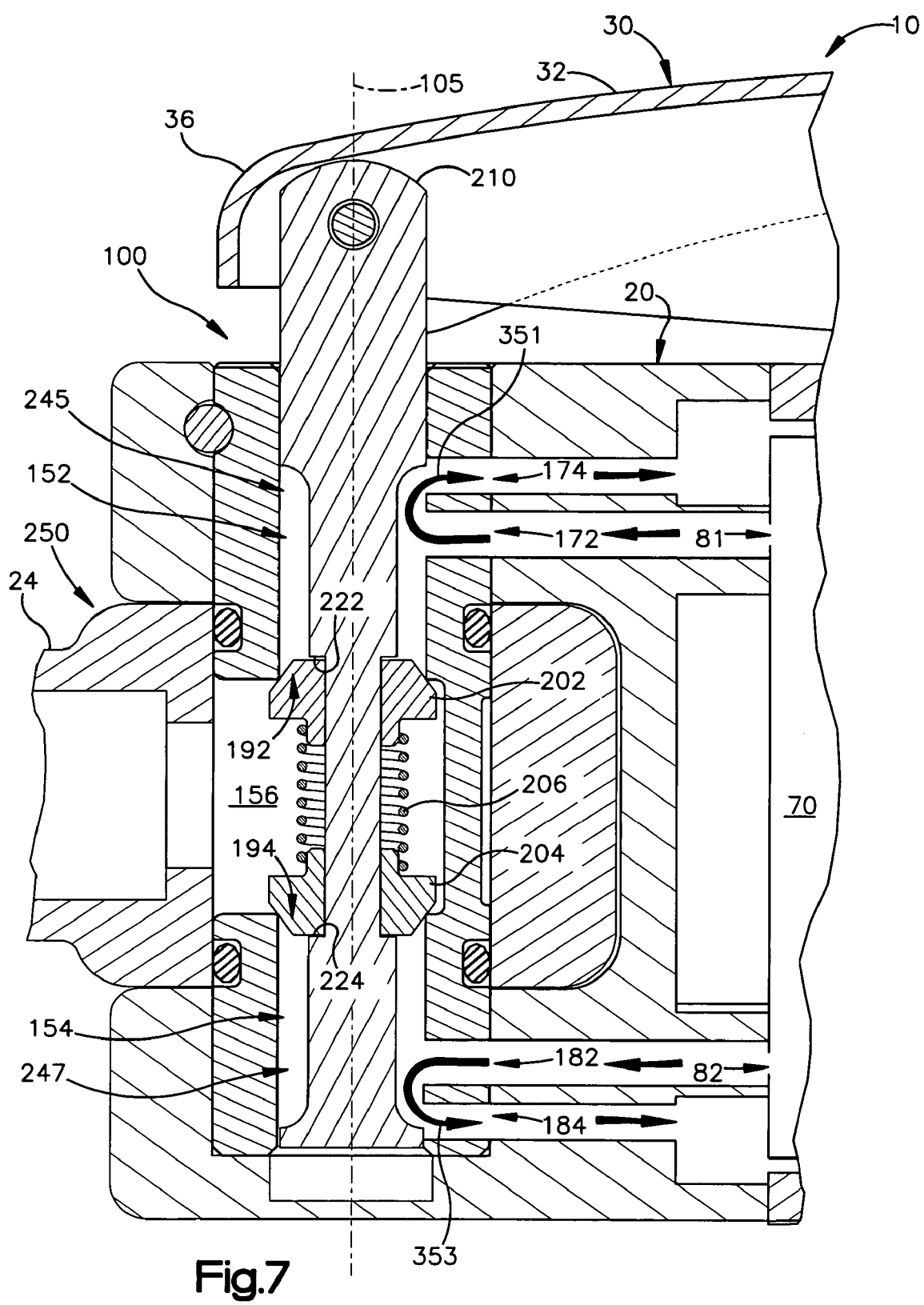
FIGS. 7-9 are sectional views similar to FIG. 4, illustrating three modes of operation of the valve.

In this example, the valve 100 is initially in the neutral condition shown in FIG. 7. This condition is characterized by the following features: Both plugs 202 and 204 are biased into their closed positions by the spring 206, thereby sealing off the upper and lower chambers 152 and 154 from the central chamber 156. Abutment of both plugs 202 and 204 against both stem abutment surfaces 222 and 224 biases the stem 210 into its neutral position. This, in turn, biases the lever 30 into its neutral position. The upper ports 172 and 174 communicate with each other through the upper axial flow space 245 in the upper chamber 152, as indicated by arrow 351. Similarly, the lower ports 182 and 184 communicate with each other through the lower axial flow space 247 in the lower chamber 154, as indicated by arrow 353. This causes both motor inlets 81 and 82 to communicate with the vents 86 (FIG. 2) to the atmosphere. Pressurized air is communicated by the nozzle 24 to the central chamber 156. However the pressurized air is isolated from all four outlet ports 172, 174, 182 and 184 by the two orifices 192 and 194 being blocked, without the inlet port 170 being blocked.

Figure 8:
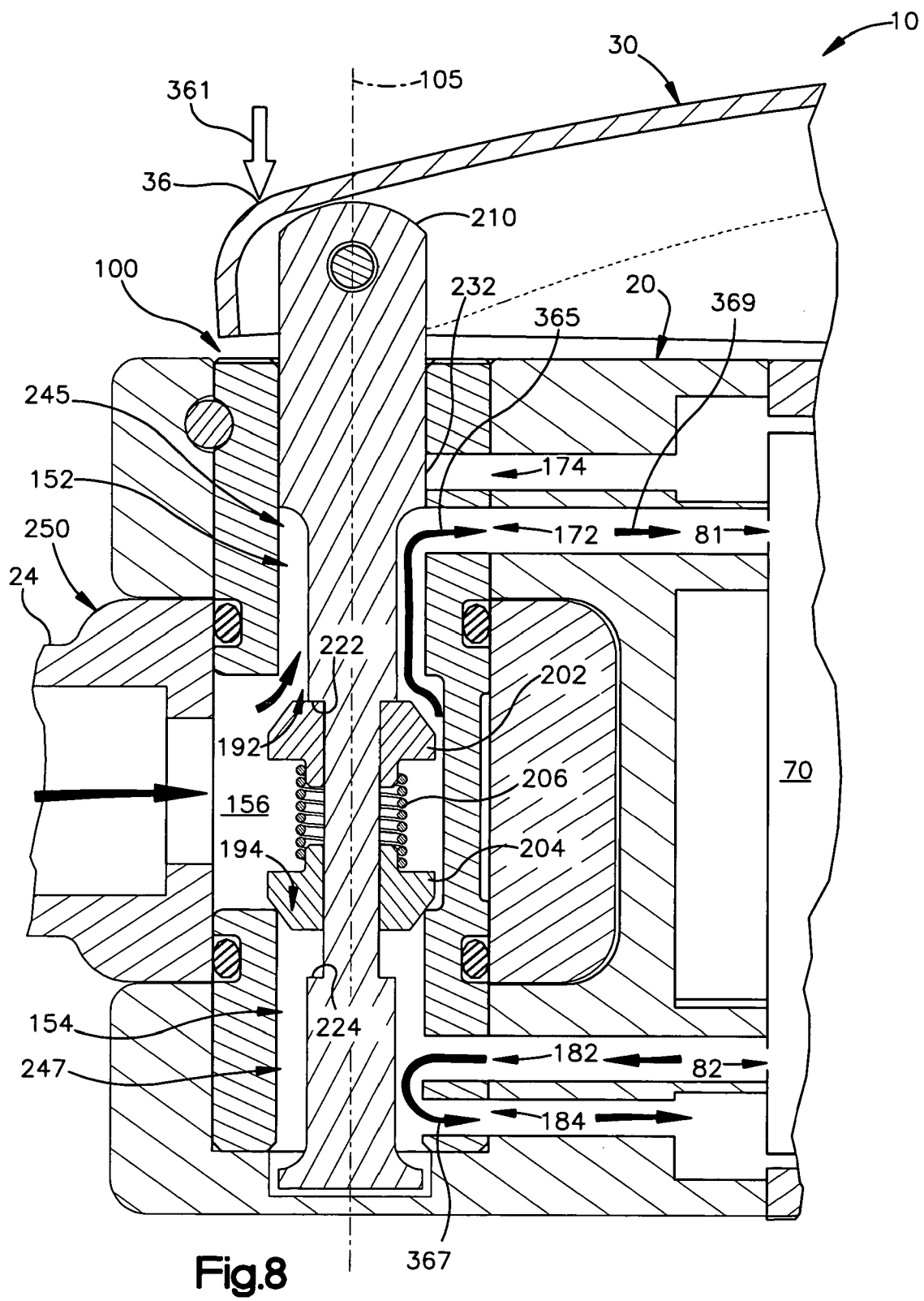

From its neutral position shown in FIG. 7, the lever 30 can be pivoted into the first pivoted position shown in FIG. 8. This is achieved by manually depressing the rear end 36 of the lever surface 32 as indicated by arrow 361. This moves the lever 30 against the spring bias into the first pivoted position. In turn, the stem 210 is pushed, against the spring bias, linearly downward from its neutral position into a lower position. The valve 100 is thus shifted into a first open condition shown in FIG. 8.

This first open condition is characterized by the following features: The upper plug 202 is in its open position. The lower plug 204 is in its closed position. Accordingly, the central chamber 156 communicates with the upper chamber 152 and the proximal upper port 172 as indicated by arrow 365, but not with the lower chamber 154. The distal upper port 174 is blocked by the upper land 232. The lower ports 182 and 184 communicate with each other through the lower axial flow space 247 in the lower chamber 154, as indicated by arrow 367. As indicated by arrow 369, the pressurized air is channeled to the first motor inlet 81. This powers the motor 70 to drive the output shaft 72 (FIG. 2), and indirectly the anvil 26, in the forward direction. The second motor inlet 82 communicates with the vents 86 to the atmosphere.

Next, in this example, the lever 30 is released. In the absence of the manual external force, the spring 206 biases the plugs 202 and 204 back into their normally-closed positions, as shown in FIG. 7. This, in turn, urges the stem 210 upward into its neutral position, which urges the lever 30 pivotally forward into its neutral position.

Figure 9:
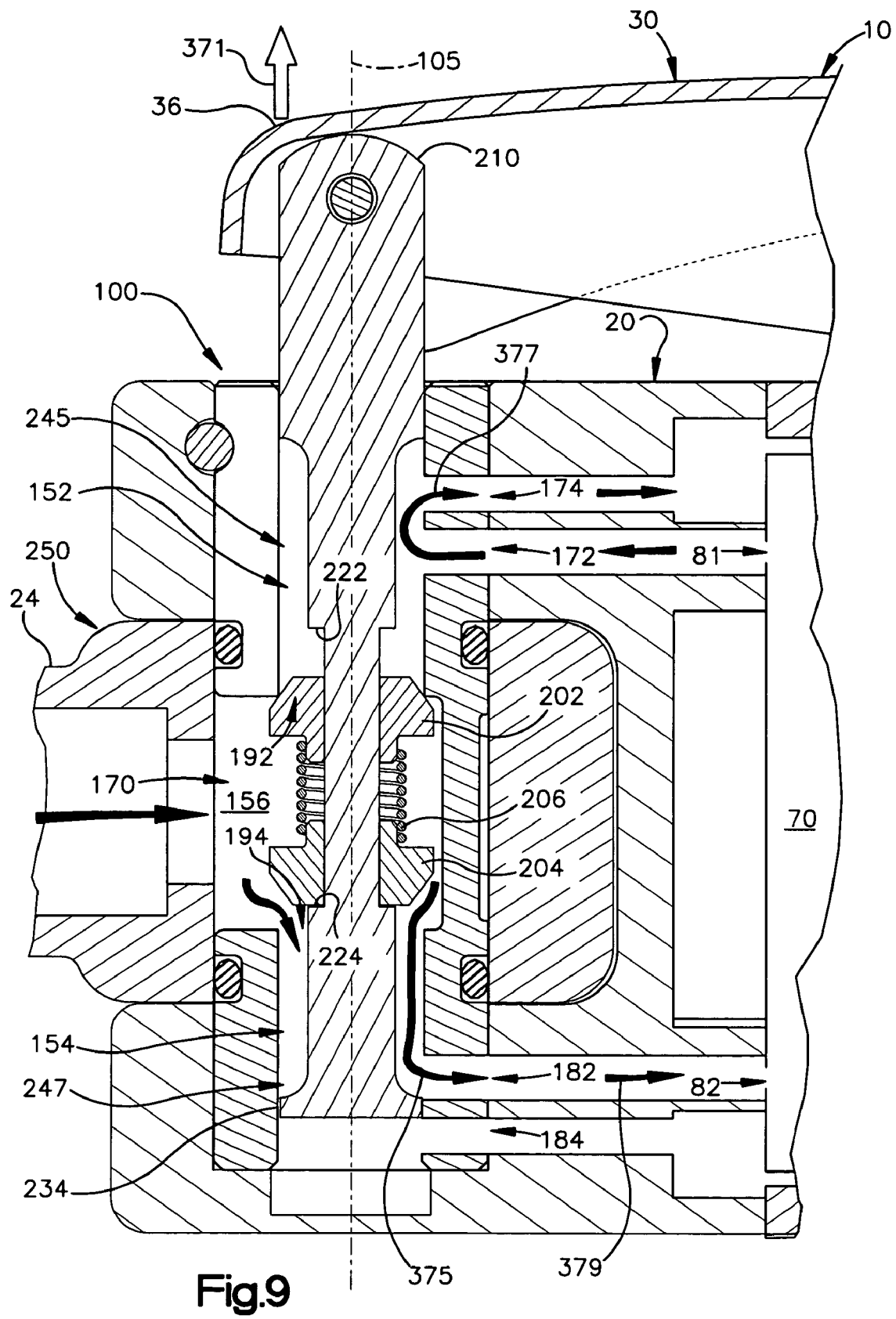

From its neutral position shown in FIG. 7, the lever 30 can be pivoted into the second pivoted position shown in FIG. 9. This is achieved by manually depressing the front end 34 (FIG. 2) of the lever top surface 30, which raises the rear end 36, as indicated by arrow 371. This moves the lever 30 against the spring bias into the second pivoted position. The stem 210 is pulled, against the spring bias, linearly upward from its neutral position into an upper position. The valve 100 is thus shifted into a second open condition shown in FIG. 9.

The second open condition is characterized by the following features: The upper plug 202 is in its closed position. The lower plug 204 is in its open position. Accordingly, the central chamber 156 communicates with the lower chamber 154 and the proximal lower port 182 as indicated by arrows 375, but not with the upper chamber 152. The distal lower port 184 is blocked and isolated from the central chamber 156 by the lower land 234. The upper ports 172 and 174 communicate with each other through the upper axial flow space 245 in the upper chamber 152, as indicated by arrow 377. As indicated by arrow 379, the pressurized air is channeled to second motor inlet 82. This powers the motor 70 to drive the output shaft 72 (FIG. 2), and indirectly the anvil 26, in the reverse direction. The first motor inlet 82 communicates with the vents 86 to the atmosphere. The inlet port 170 is not blocked in any of the three conditions of the valve 100.

Next, in this example, the lever 30 is released. In the absence of the manual external force, the spring 206 biases the plugs 202 and 204 back into their closed positions shown in FIG. 7. This, in turn, urges the stem 210 downward into its neutral position, which urges the lever 30 pivotally rearward into its neutral position.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have elements that do not differ from the literal language of the claims, or if they include equivalent structural elements with insubstantial differences from the literal language of the claims.

The invention claimed is:

1. An apparatus comprising:
  a valve body including a chamber, located on an axis, having axially upper and lower ends and upper and lower orifices located at the upper and lower ends through which air can exit the chamber;
  an upper plug configured, in a closed position, to close the upper orifice;
  a lower plug configured, in a closed position, to close the lower orifice;
  a spring compressed between the plugs so as to elastically urge the plugs axially apart and into their respective closed positions; and
  a plug displacement device configured to displace the upper plug from its closed position against bias of the spring into an open position, and to displace the lower plug from its closed position against the bias of the spring into an open position;
  wherein the plug displacement device comprises a valve stem extending axially through both orifices and having upper and lower abutment surfaces, the upper abutment surface being located above the upper plug and configured to push the upper plug downward into its open position, and the lower abutment surface being located below the lower plug and configured to push the lower plug upward into its open position; and
  both abutment surfaces simultaneously abut their respective plugs when the plugs are in their closed positions, such that the biasing of both plugs into their closed positions by the spring biases the stem into a neutral position.

2. The apparatus of claim 1 wherein the stem is closely received by the upper and lower plugs so as to keep the plugs aligned with their respective orifices as the plugs slide axially between their open and closed positions.

3. The apparatus of claim 1 wherein the stem extends axially through the spring.

4. The apparatus of claim 1 wherein the stem has a projecting section that projects upward from the valve body and by which the stem can be pushed downward to push the upper plug into its open position and pulled upward to push the lower plug into its open position.

5. An apparatus comprising:
  a valve body including a central chamber, located on an axis, having axially upper and lower ends and upper and lower orifices located at the upper and lower ends through which air can exit the central chamber;
  an upper plug configured, in a closed position, to close the upper orifice;
  a lower plug configured, in a closed position, to close the lower orifice;
  a spring compressed between the plugs so as to elastically urge the plugs axially apart and into their respective closed positions; and a plug displacement device configured to displace the upper plug from its closed position against bias of the spring into an open position, and to displace the lower plug from its closed position against the bias of the spring into an open position;

wherein the valve body further includes an upper chamber extending upward from the upper orifice, a lower chamber extending downward from the lower orifice, proximal and distal upper ports open to the upper chamber, and proximal and distal lower ports open to the lower chamber, each proximal port being axially closer to the central chamber than the corresponding distal port;

the plug displacement device comprises a valve stem extending through both orifices, and the valve has a neutral condition in which the stem is in a neutral position, both plugs are in their closed positions, the upper ports communicate with each other through the upper chamber, and the lower ports communicate with each other through the lower chamber; and the valve is shiftable from the neutral condition into a first open condition, by lowering the stem, in which the upper plug is in its open position, the lower plug is in its closed position, the distal upper port is blocked by the stem, the proximal upper port communicates with the central chamber, and the lower ports communicate with each other through the lower chamber.

6. The apparatus of claim 5 wherein the valve is shiftable from the neutral condition into a second open condition, by raising the stem, in which the upper plug is in its closed position, the lower plug is in its open position, the upper ports communicate with each other through the upper chamber, the proximal lower port communicates with the central chamber, and the distal lower port is isolated from the proximal lower port and the central chamber by the stem.

7. An apparatus comprising:
a valve body including a central chamber, located on an axis, having axially upper and lower ends and upper and lower orifices located at the upper and lower ends though which air can exit the central chamber;

an upper plug configured, in a closed position, to close the upper orifice;

a lower plug configured, in a closed position, to close the lower orifice;

a spring compressed between the plugs so as to elastically urge the plugs axially apart and into their respective closed positions; and a plug displacement device configured to displace the upper plug from its closed position against bias of the spring into an open position, and to displace the lower plug from its closed position against the bias of the spring into an open position;

wherein the valve body further includes an upper chamber extending upward from the upper orifice, a lower chamber extending downward from the lower orifice, proximal and distal upper ports open to the upper chamber, and proximal and distal lower ports open to the lower chamber, each proximal port being axially closer to the central chamber than the corresponding distal port;

the plug displacement device comprises a valve stem extending though both orifices, and the valve has a neutral condition in which the stem is in a neutral position, both plugs are in their closed positions, the upper ports communicate with each other through the upper chamber, and the lower ports communicate with each other though the lower chamber; and the valve is shiftable from the neutral condition into a first open condition, by lowering the stem, in which the upper plug is in its open position, the lower plug is in its closed position, the distal upper port is blocked by the stem, the proximal upper port communicates with the central chamber, and the lower ports communicate with each other though the lower chamber; and the valve is shiftable from the neutral condition into a second open condition, by raising the stem, in which the upper plug is in its closed position, the lower plug is in its open position, the upper ports communicate with each other through the upper chamber, the proximal lower port communicates with the central chamber, and the distal lower port is isolated from the proximal lower port and the central chamber by the stem; and further including a tool housing, an air inlet nozzle, a bi-directional air motor, an output shaft, and a vent to the atmosphere all interconnected as parts of a unitary hand-held tool, wherein the motor has first and second inlets through which air is directed to power the motor to drive the shaft respectively in forward and reverse directions, the valve body further has an inlet port open to the central chamber and connected to the nozzle, the upper and lower proximal ports are respectively connected to the first and second motor inlets, and the distal ports are connected to the vent.

8. An apparatus comprising:
a valve body including a chamber, located on an axis, having axially upper and lower ends and upper and lower orifices located at the upper and lower ends through which air can exit the chamber;

an upper plug configured, in a closed position, to close the upper orifice;

a lower plug configured, in a closed position, to close the lower orifice;

a spring compressed between the plugs so as to elastically urge the plugs axially apart and into their respective closed positions; and a plug displacement device configured to displace the upper plug from its closed position against bias of the spring into an open position, and to displace the lower plug from its closed position against the bias of the spring into an open position;

wherein the valve body includes an inlet port communicating with the chamber, and the apparatus further includes a sleeve sealed about the valve body both above and below the inlet port and rotatable about the axis relative to the valve body, and an inlet nozzle that projects radially outward from the sleeve and communicates with the inlet port through the sleeve.

9. An apparatus comprising:
a valve body located on an axis and defining an axially extending channel that includes an axially upper chamber, an axially lower chamber, a central chamber located between the upper and lower chambers, and further defining an upper outlet port open to the upper chamber, a lower outlet port open to the lower chamber, and an inlet port open to the central chamber; and a valve stem extending axially in the channel and shiftable between a neutral position for isolating both outlet ports from the inlet port, a lower position below the neutral position for communicating the upper outlet port with the inlet port, and an upper position above the neutral position for communicating the lower outlet port with the inlet port, without blocking the inlet port in any of the three positions;

wherein said upper outlet port is a first upper outlet port, and said lower outlet port is a first lower outlet port, and further comprising a second upper outlet port open to the upper chamber and spaced above the first upper outlet port, and further comprising a second lower outlet port open to the lower chamber and spaced below the first lower outlet port;

the body and the stem are together configured such that, when the stem is in the neutral position, the upper outlet ports communicate with each other but not with the inlet port, and the lower outlet ports communicate with each other but not with the inlet port;

when the stem is in the lower position, the second upper outlet port is blocked by the stem, the first upper outlet port communicates with the inlet port, and the lower outlet ports communicate with each other but not with the inlet port; and when the stem is in the upper position, the upper outlet ports communicate with each other but not with the inlet port, the first lower outlet port communicates with the inlet port, and the second lower outlet port is isolated from the inlet port by the stem.

* * * * *